(12) United States Patent
Sumikawa et al.

(10) Patent No.: US 10,169,885 B2
(45) Date of Patent: Jan. 1, 2019

(54) VEHICLE DISPLAY SYSTEM AND METHOD OF CONTROLLING VEHICLE DISPLAY SYSTEM

(71) Applicant: SUBARU CORPORATION, Tokyo (JP)

(72) Inventors: Ryuichi Sumikawa, Tokyo (JP); Noeru Sato, Tokyo (JP); Takeshi Torii, Tokyo (JP)

(73) Assignee: Subaru Corporation, Tokyo (JP)

( * ) Notice: Subject to any disclaimer, the term of this patent is extended or adjusted under 35 U.S.C. 154(b) by 0 days.

(21) Appl. No.: 15/898,279

(22) Filed: Feb. 16, 2018

(65) Prior Publication Data

US 2018/0268564 A1     Sep. 20, 2018

(30) Foreign Application Priority Data

Mar. 15, 2017   (JP) ................. 2017-050343

(51) Int. Cl.
*G06T 7/70*      (2017.01)
*G06K 9/00*     (2006.01)
*B60K 35/00*    (2006.01)

(52) U.S. Cl.
CPC ............. *G06T 7/70* (2017.01); *B60K 35/00* (2013.01); *G06K 9/00845* (2013.01);
(Continued)

(58) Field of Classification Search
CPC ..... B29C 47/40; B29C 47/52; B29C 47/6012; B65G 15/44; B65G 2203/0233; B65G 2203/0266; B65G 2203/044; B65G 2811/0673; B65G 43/00; H05K 13/0061; H05K 13/0069; H05K 13/02; H05K 13/0408; B60K 2350/1096; B60K 2350/962; B60K 2350/965; B60K 35/00; G06K 9/00845; G06T 7/70
(Continued)

(56) References Cited

U.S. PATENT DOCUMENTS

2012/0265416 A1*  10/2012  Lu ..................... B60R 1/00
                                               701/70
2016/0171317 A1*  6/2016   Kim .................. G06T 5/006
                                               382/103
2017/0140542 A1*  5/2017   Hodohara ......... B60R 1/00

FOREIGN PATENT DOCUMENTS

JP    2007-052719 A    3/2007
JP    2007-324643 A    12/2007
JP    2015-177486 A    10/2015

OTHER PUBLICATIONS

Maruyama, et al., "Introduction of Driver Monitor System," OKI Technical Review 220, vol. 79, No. 2, Nov. 2012 (with English translation).

(Continued)

*Primary Examiner* — Ojiako K Nwugo
(74) *Attorney, Agent, or Firm* — McDermott Will & Emery LLP

(57) ABSTRACT

A vehicle display system includes a display device, a position acquiring unit, and a distortion correction processor. The display device is mounted on a vehicle. The position acquiring unit is configured to acquire a position of a target by which an image to be displayed by the display device is to be viewed. The distortion correction processor is configured to correct, on a basis of the position of the target acquired by the position acquiring unit, distortion of the image to be displayed by the display device.

16 Claims, 9 Drawing Sheets

(52) U.S. Cl.
CPC ............... *B60K 2350/1096* (2013.01); *B60K 2350/962* (2013.01); *B60K 2350/965* (2013.01)

(58) Field of Classification Search
USPC .......................................... 340/438
See application file for complete search history.

(56) References Cited

OTHER PUBLICATIONS

Japanese Office Action issued in corresponding Japanese Patent Application No. 2017-050343, dated Jul. 10, 2018, with English Translation.

* cited by examiner

| POSITION OF TARGET | x-DIRECTIONAL CORRECTION AMOUNT | y-DIRECTIONAL CORRECTION AMOUNT |
|---|---|---|
| ⬭ | ○○ | ×× |
| ⬭ | ×△ | △○ |
| ⬭ | □○ | ○□ |
| ⬭ | ×□ | ○△ |
| ⬭ | △△ | ○× |
| ⬭ | △× | ×△ |
| ⋮ | ⋮ | ⋮ |

~800

VEHICLE DISPLAY SYSTEM AND METHOD OF CONTROLLING VEHICLE DISPLAY SYSTEM

CROSS-REFERENCE TO RELATED APPLICATIONS

The present application claims priority from Japanese Patent Application No. 2017-050343 filed on Mar. 15, 2017, the entire contents of which are hereby incorporated by reference.

BACKGROUND

The technology relates to a vehicle display system and a method of controlling the vehicle display system.

Japanese Unexamined Patent Application Publication (JP-A) No. 2007-52719 discloses an exemplary technique in which images are displayed on both surfaces of a display glass panel of a vehicle. Furthermore, a message to be given to a person around the vehicle is displayed on the outer surface of the display glass panel.

Nowadays, a technique in which a state of a person is recognized on the basis of image information on his/her face is commonly used. As an example, Yuto Maruyama and Atsuko Matsuoka, "Introduction of Driver Monitoring System." Oki Technical Review, issue 220, volume 79, no. 2, November 2012, discloses a technique in which a state of a driver of a vehicle is monitored through facial recognition while the vehicle is running.

SUMMARY

An aspect of the technology provides a vehicle display system that includes: a display device mounted on a vehicle; a position acquiring unit configured to acquire a position of a target by which an image to be displayed by the display device is to be viewed; and a distortion correction processor configured to correct, on a basis of the position of the target acquired by the position acquiring unit, distortion of the image to be displayed by the display device.

An aspect of the technology provides a method of controlling a vehicle display system. The method includes: acquiring a position of a target by which an image to be displayed by a display device mounted on a vehicle is to be viewed; and correcting, on a basis of the acquired position of the target, distortion of the image to be displayed by the display device.

An aspect of the technology provides a vehicle display system that includes: a display device mounted on a vehicle; and circuitry configured to acquire a position of a target by which an image to be displayed by the display device is to be viewed, and correct, on a basis of the acquired position of the target, distortion of the image to be displayed by the display device.

DETAILED DESCRIPTION

Figure 1:
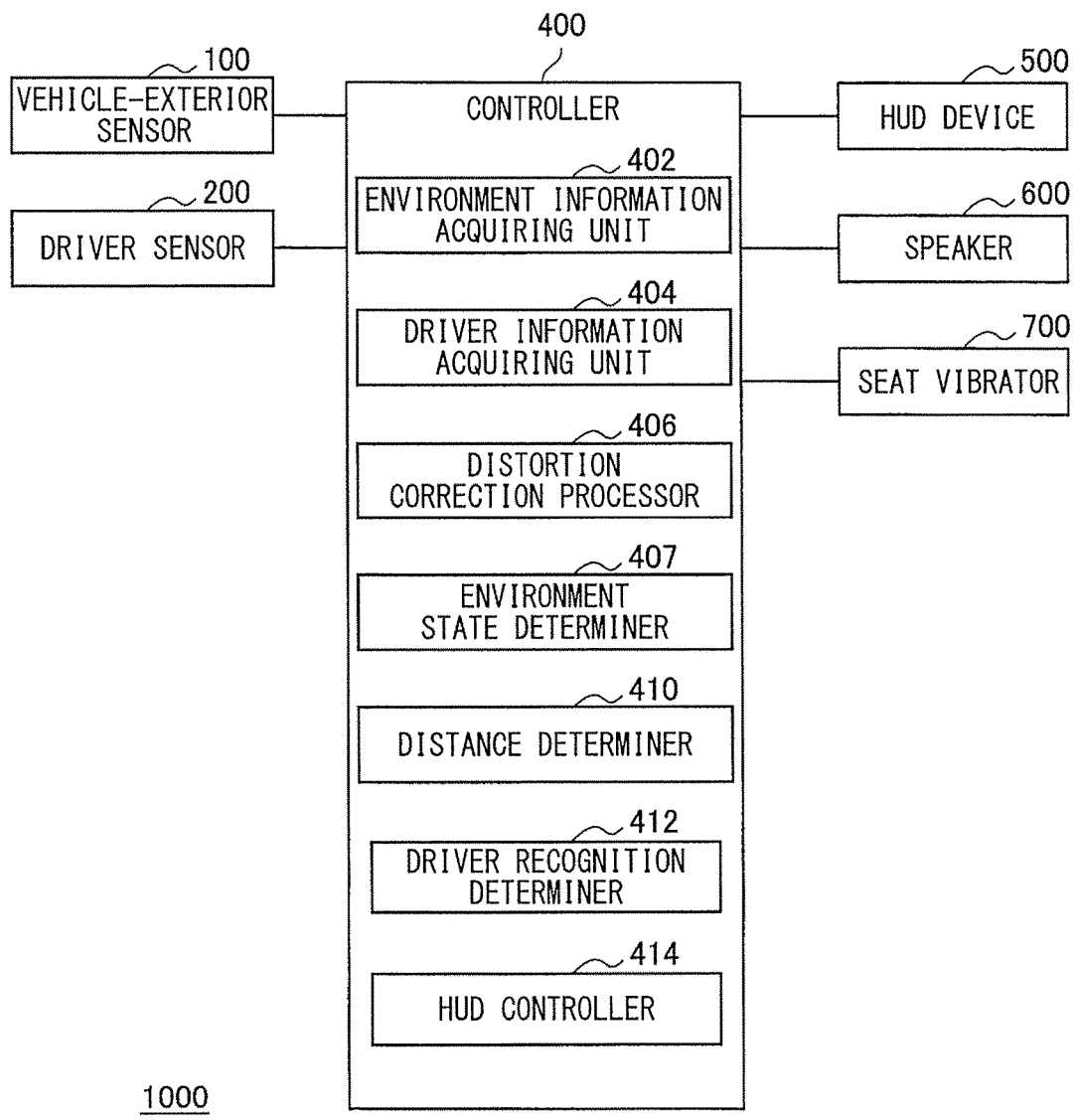
FIG. 1 schematically illustrates an example of a configuration of a vehicle system according to one implementation of the technology.

In a technique disclosed in JP-A No. 2007-52719, it may be difficult to identify for which person a message displayed on an outer surface of a display glass panel of a vehicle is intended.

It is desirable to provide a vehicle display system and a method of controlling the vehicle display system that both make it possible to reliably identify for which target, by which a display is to be viewed, a message is intended.

In the following, some non-limiting implementations of the technology are described in detail with reference to the accompanying drawings. Note that the following description is directed to illustrative examples of the disclosure and not to be construed as limiting the technology. Factors including, without limitation, numerical values, shapes, materials, components, positions of the components, and how the components are coupled to each other are illustrative only and not to be construed as limiting the technology. Further, elements in the following example implementations which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description.

FIG. 1 schematically illustrates an example of a configuration of a vehicle display system 1000 according to one implementation of the technology. The vehicle display system 1000 may be basically mounted in a vehicle. The vehicle may be, for example but not limited to, an automobile. Referring to FIG. 1, the vehicle display system 1000 may include vehicle-exterior sensors 100, a driver sensor 200, a controller 400, a HUD device 500, speakers 600, and seat vibrators 700.

Each of the vehicle-exterior sensors 100 may be a stereo camera, a monocular camera, millimeter wave radar, an infrared sensor, or any other sensing device. Each vehicle-exterior sensor 100 may measure a parameter such as, but not limited to, a position and speed of an object. Non-limiting examples of the object may include a vehicle and a person around the vehicle. In an example implementation, each vehicle-exterior sensor 100 may be a stereo camera that includes a pair of right and left cameras each having an imaging device such as, but not limited to, a charge-coupled device (CCD) sensor or a complementary metal-oxide semiconductor (CMOS) sensor. Then, the stereo camera may capture an image of an environment outside a vehicle and transmit information on the captured image to the controller 400. In an example implementation, the stereo camera may be a color camera disposed on an upper portion of a windshield of the vehicle and be able to acquire color information.

The HUD device 500 may be a display device that displays information directly in a human visual field. The HUD device 500 may display a real image on a window such as, but not limited to, the windshield or a rear window of the vehicle. Although a known HUD device typically displays a virtual image, the HUD device 500 in this implementation may be a display device that displays a real image. The HUD device 500 may display a real image at a viewing angle of about 360 degrees, thereby allowing both persons inside and outside the vehicle to view the image. In an alternative implementation, however, the HUD device 500 may display a virtual image.

Figure 2:
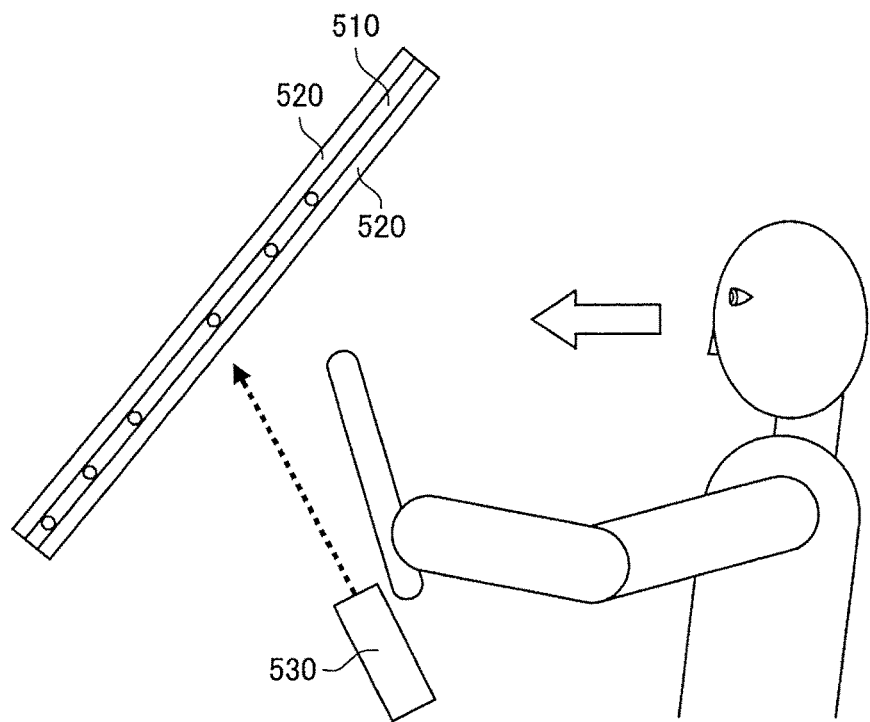
FIG. 2 schematically illustrates an example of a head-up display (HUD) device that includes a self-luminous interlayer film.

In one specific but non-limiting implementation, the HUD device 500 may be a device that includes a self-luminous interlayer film 510, as illustrated in FIG. 2. In such an implementation, the self-luminous interlayer film 510 may be disposed between two sheets of glass 520 in the window of the vehicle such as, but not limited to, the windshield and the rear window. The self-luminous interlayer film 510 may contain a luminescence material. When a portion of the self-luminous interlayer film 510 is irradiated with laser light from a projector 530 mounted in the vehicle, the irradiated portion may emit light, displaying objects, including characters and images. The objects may have visibility at all angles and may be thus viewable not only from the driver seat but also from the other seats as well as any location outside the vehicle. In an alternative implementation, the HUD device 500 may have a configuration in which a self-luminous device is disposed at the window of the vehicle. In such an alternative implementation, the HUD device 500 may have a transparent screen that contains an organic electroluminescence (EL) element, a transmissive liquid crystal device, or any other member that allows for transmissive displaying. In a further alternative implementation, any device other than the HUD device 500 may be used as the display device. In such an alternative implementation, a large-sized liquid crystal display device, a light-emitting diode (LED) display device, or any display device provided on a member such as, but not limited to, an instrument panel may be used as the display device. In the following, a description is given of one implementation in which the HUD device 500 provides a display on the window, such as the windshield and the rear window, of the vehicle. In one implementation, the HUD device 500 may serve as a "display device". The display device according to any implementation of the technology, however, is not limited to the HUD device 500. The term "HUD device" or "display device" according to any implementation of the technology encompasses any and all display devices provided inside and/or outside a vehicle. In an example implementation, the display device may be provided at any external site of the vehicle other than the window, such as a body of the vehicle. In an example implementation, the display device may be provided at any internal site of the vehicle other than the window, such as the instrument panel and a seat. The display devices disposed inside and outside the vehicle may be provided integrally with or separately from each other. Accordingly, the wording "mounted on" the vehicle as used herein and its variants are intended to encompass both an implementation in which the display device is located inside the vehicle and an implementation in which the display device is located outside the vehicle.

The driver sensor 200 may be implemented by a camera, a line-of-sight sensor, a motion sensor, or any other sensing device. This driver sensor 200 may measure movements of the driver's arms and head, a direction of his/her line of sight, and any other parameters related to the driver. In an example implementation where the driver sensor 200 is a camera, the driver sensor 200 may acquire the movements of the arms and head, the direction of the line of sight, and any other parameters by subjecting an image captured by the camera to image processing. In another example implementation where the driver sensor 200 is a line-of-sight sensor, the driver sensor 200 may detect the line of sight by using a corneal reflection method or any other similar method. The seating sensors 300 may be provided in the respective seats of the vehicle, and each of the seating sensors 300 may determine whether a person sits on a corresponding seat. The speakers 600 may emit a warning sound toward the inside and outside of the vehicle when the HUD device 500 displays a warning to persons inside and outside of the vehicle. The seat vibrators 700 may be provided in the respective seats inside the vehicle. In addition, the seat vibrators 700 may vibrate the seats to give a warning to the driver and occupants when the HUD device 500 displays a warning inside the vehicle.

The controller 400 may control the displaying of the HUD device 500 on the basis of the information detected by the vehicle-exterior sensors 100, the driver sensor 200, and other sensors. The controller 400 may include an environment information acquiring unit 402, a driver information acquiring unit 404, a distortion correction processor 406, an environment state determiner 407, a distance determiner 410, a driver recognition determiner 412, and a HUD controller 414. In one implementation, the environment information acquiring unit 402 may serve as a "position acquiring unit". In one implementation, the HUD controller 414 may serve as a "display controller". Each of the components of the controller 400 may be implemented in hardware or in software. In an example implementation where one component of the controller 400 is implemented in hardware, this component may be circuitry. In another example implementation where one component of the controller 400 is implemented in software, this component may be a program that causes a central processing unit (CPU) or other processor to perform its function.

The environment information acquiring unit 402 may acquire information on a distance to a target, namely, a subject in this case. This information may be called distance information. In an example implementation, the environment information acquiring unit 402 may generate the distance information, on the basis of an amount of shift between corresponding locations in a pair of right and left stereo images and by means of principle of triangulation. The pair of right and left stereo images may be captured by a set of right and left cameras of the stereo camera which constitutes each vehicle-exterior sensor 100 in one implementation. Together with the acquisition of the distance information, the environment information acquiring unit 402 may also acquire information on a location of the subject from the information on the images captured by the set of right and left cameras of the stereo camera which constitutes each vehicle-exterior sensor 100. This information may be called image information. Further, the environment information acquiring unit 402 may perform a known grouping process on the distance information generated by the principle of triangulation. Then, the environment information acquiring unit 402 may obtain data on a three-dimensional object, a lane line, and other objects by comparing the distance information subjected to the grouping process with preset three-dimensional data such as, but not limited to, three-dimensional object data. By performing the processes in this manner, the controller 400 is able to recognize various entities, including a person, another vehicle, a stop sign, a stop line, and an electronic toll collection (ETC) gate.

On the basis of the information on the distance to a factor generated by the principle of triangulation, the environment information acquiring unit 402 may also calculate a variation in the distance to the factor and/or a speed relative to the factor. Non-limiting examples of the factor may include a person and another vehicle. The variation in the distance may be determined by integrating distances to the factor in frame images. The frame images may be acquired at regular time intervals. The relative speed may be determined by dividing the distances acquired at regular time intervals by the unit time.

In the above manner, the environment information acquiring unit 402 may acquire the image information regarding an environment outside the vehicle, from the vehicle-exterior sensors 100. In addition, the environment information acquiring unit 402 may analyze the acquired image information through an image analyzing process. As a result of analyzing the image information, the environment information acquiring unit 402 may acquire environment information regarding the environment outside the vehicle.

Figure 3:
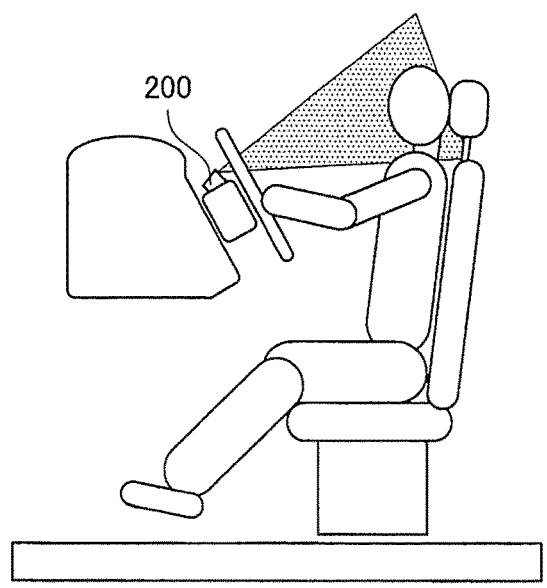
FIG. 3 schematically illustrates an example of a state where a driver sensor captures an image of a driver of a vehicle.

FIG. 3 schematically illustrates an example of a state where the driver sensor 200 captures an image of the driver if the driver sensor 200 is implemented by a camera. As illustrated in FIG. 3, as an example, the driver sensor 200 may be mounted on an upper portion of a steering column.

In an example implementation where the driver sensor 200 is a camera, the image captured by the driver sensor 200 may be supplied to the controller 400. Then, the driver information acquiring unit 404 may acquire a face region of the driver from the received image through an image processing technique such as, but not limited to, an edge and face detection technique. The driver information acquiring unit 404 thereby may acquire an orientation of the face on the basis of the face region.

Figure 4:
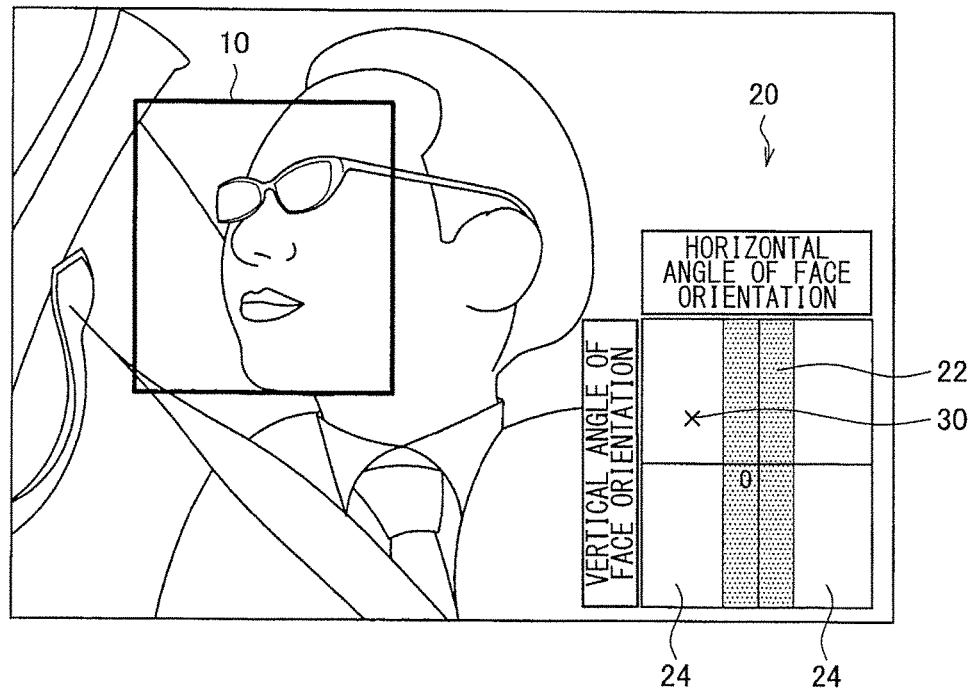
FIG. 4 schematically illustrates an example of a manner in which an angle at which a driver's face is oriented and other face-related factors are calculated on the basis of a face region of the driver.

FIG. 4 schematically illustrates an example of a manner in which an angle at which a face is oriented and other face-related factors are calculated on the basis of a face region 10 of the driver which has been detected. On the basis of the face region 10 of the driver which has been acquired from the image information, the controller 400 may monitor whether the face orientation of the driver falls outside a predetermined region, thereby making it possible to determine a possibility that the driver looks aside. In such an implementation, the face region 10 of the driver may be defined from the location information on the feature points of the parts, including the eyes, the nose, and the mouth, of the face. In order to estimate the face orientation, as an example, the controller 400 may use, as a reference, a distance between the eyes as seen from the front and then may compare this reference with a distance between the eyes obtained from the image information. It may be determined that, as the distance between the eyes obtained from the image information becomes smaller than the reference, the face is oriented sideways more largely as seen from the front.

FIG. 4 illustrates a detection result 20 at its lower right. In the detection result 20, the vertical axis represents "vertical angle of face orientation", the horizontal axis represents "horizontal angle of face orientation", and an X-mark 30 denotes "detected angles of face orientation". In the detection result 20, a shaded, rectangular area at the center may be a front region 22. If detected angles of the face orientation fall within the front region 22, the controller 400 may determine that the driver looks ahead. If the detected angles are shifted from within the front region 22 to within one of right and left side regions 24, as indicated by the X-mark 30, the controller 400 may determine that there is a possibility that the driver looks aside. Thresholds used to differentiate the front region 22 and right and left side regions 24 from one another may be varied as appropriate. In one example implementation, the thresholds may be set to about −20 degrees and +20 degrees in the horizontal direction.

The environment state determiner 407 in the controller 400 may determine an environment state outside the vehicle on the basis of the environment information acquired by the environment information acquiring unit 402. Further, the environment state determiner 407 may determine states of persons as the targets outside the vehicle. The distance determiner 410 may determine distances between the vehicle and the targets outside the vehicle and distances between the targets, on the basis of the distance information acquired by the environment information acquiring unit 402. The driver recognition determiner 412 may determine whether the driver is aware of the targets, on the basis of the positions of the targets (or the persons in one implementation) outside the vehicle which have been acquired by the environment information acquiring unit 402 and the face orientation or line of sight of the driver which has been acquired by the driver information acquiring unit 404.

The distortion correction processor 406 may perform a process of correcting distortion of an image to be displayed by the HUD device 500, on the basis of a position, which has been acquired by the environment information acquiring unit 402, of a target by which the image to be displayed by the HUD device 500 is to be viewed. The HUD controller 414 may control the displaying of the HUD device 500, thereby performing a process of displaying, on the HUD device 500, the image corrected by the distortion correction processor 406. In an example implementation, the HUD controller 414 may control the displaying of the HUD device 500 on the basis of the determination results of the environment state determiner 407, the distance determiner 410, and the driver recognition determiner 412.

In one implementation, the HUD device 500 may display an image in such a way that it is possible to understand for which of the persons inside and outside the vehicle the image is intended, in accordance with a situation around the vehicle. In such an implementation, the distortion correction processor 406 may correct the image in accordance with a factor such as, but not limited to, an inclination or irregularity of the windshield of the vehicle so that the target, for which viewing of the image is intended, is able to view the image easily and clearly. When any person other than the target views the image, this image may be perceived as being distorted. Hence, it is possible to easily identify for which of persons inside and outside the vehicle the image is intended.

In one implementation, if a plurality of targets are present for which viewing of an image is intended, the distortion correction processor 406 may correct distortion of the image for a center location (in one implementation, may be an intermediate location) between positions of the respective targets, and then the HUD device 500 may display the resultant image toward the outside of the vehicle. However, in one implementation, if the targets are positioned at a considerably long distance from one another, the distortion correction processor 406 may correct the distortion of the image for the target closer to the vehicle.

In one implementation, when the driver recognition determiner 412 determines that the driver is not aware of the target for which viewing of an image is intended on the basis of the information detected by the driver sensor 200, the distortion correction processor 406 may change the target for which viewing of an image is intended from the target outside the vehicle to the driver, and may correct distortion of the image for the driver. Then, the HUD device 500 may display the resultant image toward the driver. When the driver recognition determiner 412 determines that the driver is aware of the target, the HUD device 500 may correct distortion of the image for a target outside the vehicle. Then, the HUD device 500 may display the resultant image toward the target.

Figure 5:
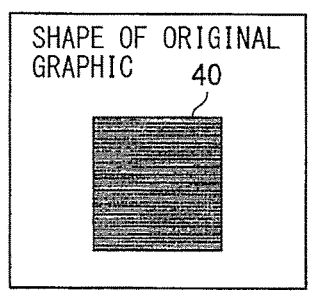
FIG. 5 schematically illustrates an example of a manner in which a target for which viewing of an image is intended is set to the driver in the vehicle and distortion of the image is corrected for the driver.
Figure 6:
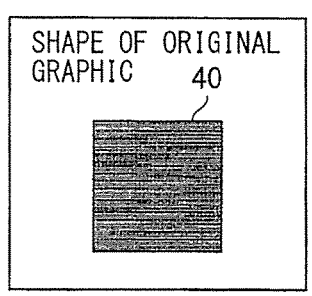
FIG. 6 schematically illustrates an example of a manner in which the distortion of the image is corrected for a target A of FIG. 8.
Figure 7:
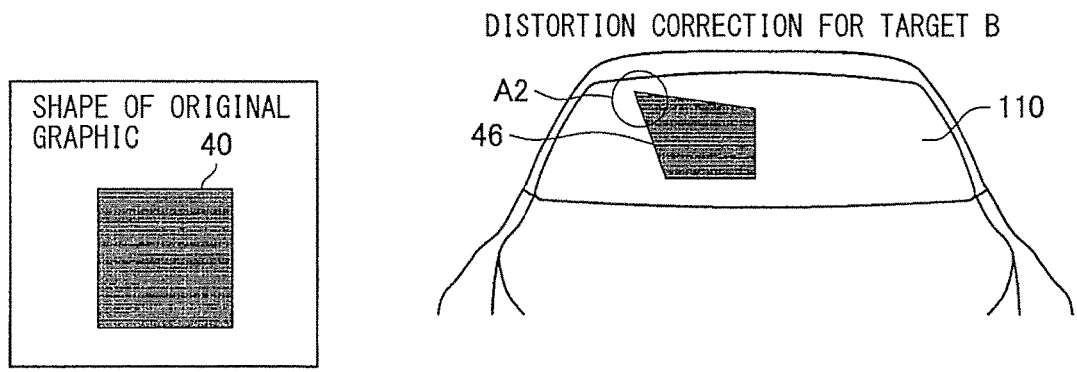
FIG. 7 schematically illustrates an example of a manner in which the distortion of the image is corrected for a target B of FIG. 8.
Figure 8:
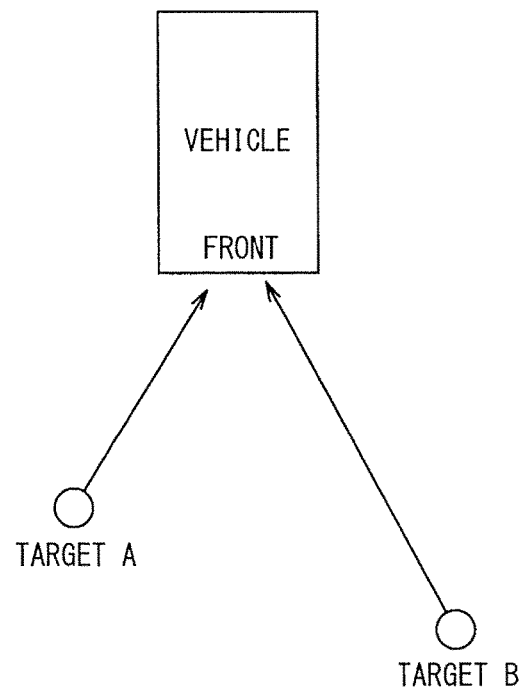
FIG. 8 schematically illustrates a positional relationship between the vehicle and the targets A and B present outside the vehicle.

FIGS. 5 to 7 each schematically illustrate an example of an image in which the distortion correction processor 406 has corrected the distortion for a target inside or outside of the vehicle. FIG. 8 schematically illustrates a positional relationship between the vehicle and targets A and B present outside the vehicle. Although the targets A and B are present in FIG. 8, a plurality of targets do not necessarily have to be present. In an alternative implement, only one target may be present. FIG. 5 schematically illustrates an example of a manner in which a target for which viewing of an image is intended is set to the driver in the vehicle and distortion of the image is corrected for the driver. If an original graphic 40 is square in shape as illustrated in the left part of FIG. 5, the distortion correction processor 406 may create an image 42 by correcting distortion of the original graphic 40 in accordance with an inclination and curvature of the windshield 110 and the position of the driver. Then, the HUD device 500 may display the image 42 on the windshield 110. As is seen from the right part of FIG. 5, the image 42, which is created as a result of correcting the distortion of the original graphic 40, may have a horizontal length decreasing toward an upper edge of the windshield 110. This is because the windshield 110 is inclined so that its upper edge is closer to the driver than its lower edge. In addition, the distortion of the original graphic 40 resulting from the curvature of the windshield 110 is also corrected. As a result, when viewing the image 42 displayed on the windshield 110, the driver is expected to perceive the image 42 as being square in shape, which is similar to a shape of the original graphic 40.

FIG. 6 schematically illustrates an example of a manner in which the distortion of the image is corrected for the target A of FIG. 8. If an original graphic 40 is square in shape as illustrated in the left part of FIG. 6, the distortion correction processor 406 may create an image 44 by correcting distortion of the original graphic 40 in accordance with the inclination and curvature of the windshield 110 and the position of the target A. Then, the HUD device 500 may display the image 44 on the windshield 110. As a result, the target A is able to view the image 44 in which the distortion of the original graphic 40 resulting from the inclination and curvature of the windshield 110 is corrected. Thus, the target A is expected to perceive the image 44 as being square in shape, which is similar to a shape of the original graphic 40. In an example implementation, the image 44 may have an upper right region Al lengthened toward the upper right, so that the distortion of the original graphic 40 resulting from the inclination of the windshield 110 is corrected. As a result, when viewing the image 44 in which the distortion has been corrected, the target A is expected to recognize that the image 44 is displayed toward the target A itself. Furthermore, when someone views the image 44 at any position other than the position of the target A, he/she may perceive the original graphic 40 as being unnaturally distorted. Therefore, any target other than the target A is expected to recognize that the image 44 is not displayed toward the target itself.

FIG. 7 schematically illustrates an example of a manner in which the distortion of the image is corrected for the target B of FIG. 8. If the original graphic 40 has a square shape as illustrated in the left part of FIG. 7, the distortion correction processor 406 may create an image 46 by correcting distortion of the original graphic 40 in accordance with the inclination and curvature of the windshield 110 and a position of the target B. Then, the HUD device 500 may display the image 46 on the windshield 110. As a result, the target B is able to view the image 46 in which the distortion of the original graphic 40 resulting from the inclination and curvature of the windshield 110 is corrected. Thus, the target B is expected to perceive the image 46 as being square in shape, which is similar to a shape of the original graphic 40. In an example implementation, the image 46 may have an upper left region A2 lengthened toward the upper left, so that the distortion of the original graphic 40 resulting from the inclination of the windshield 110 is corrected. As a result, when viewing the image 46 in which the distortion has been corrected, the target B is expected to recognize that the image 46 is displayed toward the target B itself. Furthermore, when someone views the image 46 at any position other than the position of the target B, he/she may perceive the original graphic 40 as being unnaturally distorted. Therefore, any target other than the target B is expected to recognize that the image 46 is not displayed toward the target itself.

Figure 9:
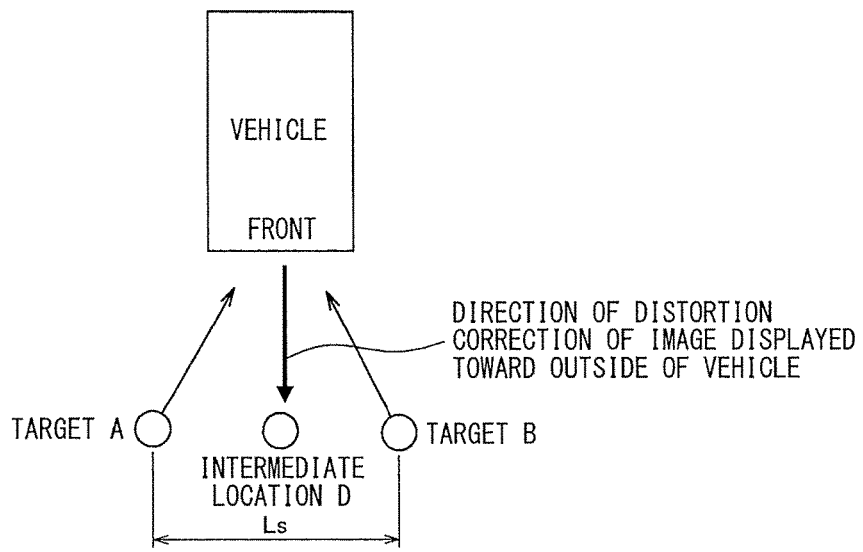
FIG. 9 schematically illustrates an example of a manner in which the distortion of the image is corrected when a plurality of targets are present.
Figure 10:
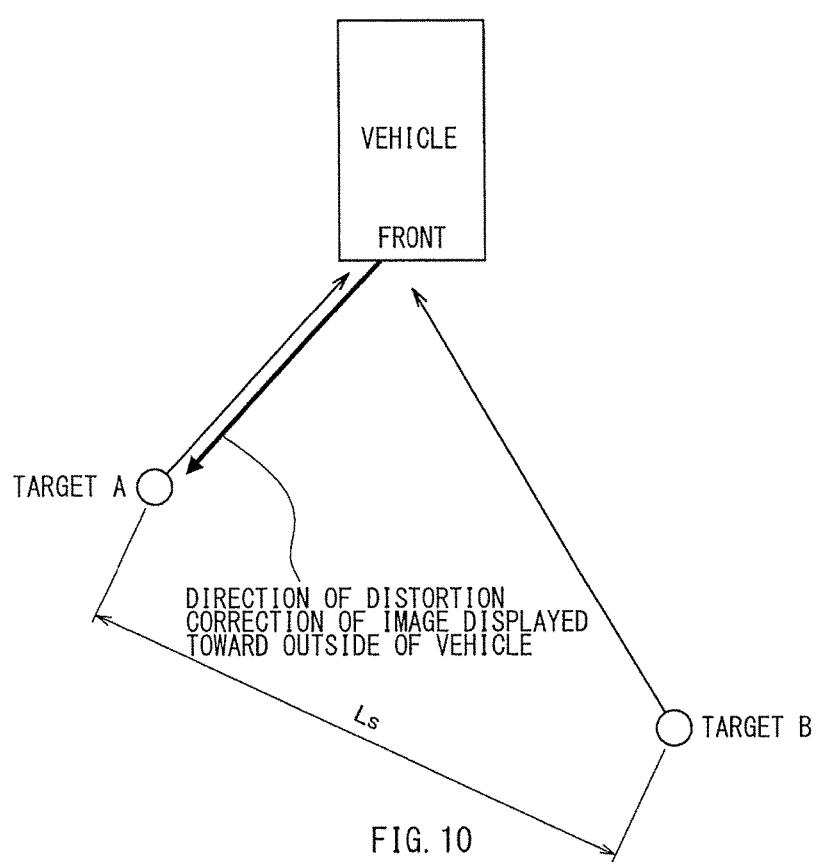
FIG. 10 schematically illustrates another example of a manner in which the distortion of the image is corrected when the plurality of targets are present.
Figure 14:
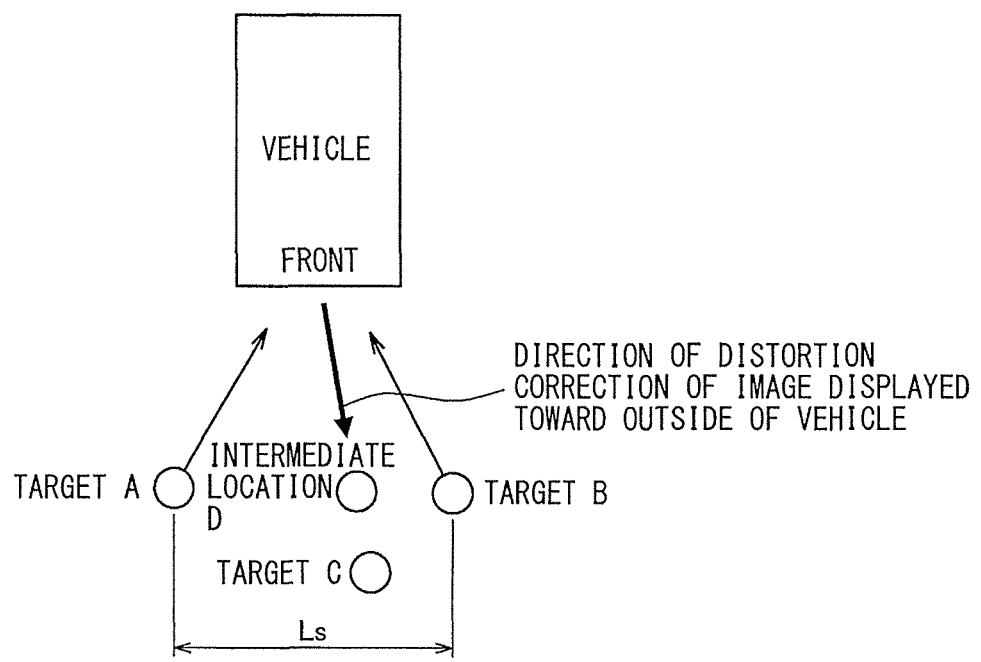
FIG. 14 schematically illustrates further another example of a manner in which the distortion of the image is corrected when the plurality of targets are present.

FIGS. 9, 10, and 14 each illustrate an example of a manner in which the distortion of the image is corrected when a plurality of targets are present. In the example of FIG. 9, two targets, namely, the targets A and B are present, where a distance Ls between the targets A and B is shorter than a predetermined threshold distance Y. The distance Ls and the threshold distance Y may be in meters in one implementation. When the distance between the targets A and B is relatively short as illustrated in FIG. 9, the distortion correction processor 406 may correct an image for an intermediate location D between the targets A and B. For example, when the original graphic 40 has a square shape, the distortion correction processor 406 may correct the distortion of the original graphic 40 in accordance with the inclination and curvature of the windshield 110 and a position of the intermediate location D. Then, the HUD device 500 may display the resultant image on the windshield 110. In the example of FIG. 14, three targets, namely, targets A, B, and C are present, where the distance Ls between the targets A and B, which are most distant among the targets A, B, and C, is shorter than the predetermined threshold distance Y. When three or more targets are present and the longest distance between the targets is relatively short as illustrated in FIG. 14, the distortion correction processor 406 may correct a distortion of an image for the intermediate location D between the targets A, B, and C. For example, when the original graphic 40 has a square shape, the distortion correction processor 406 may correct the distortion of the original graphic 40 in accordance with the inclination and curvature of the windshield 110 and the position of the intermediate location D. Then, the HUD device 500 may display the resultant image on the windshield 110.

In the example of FIG. 10, two targets, namely, the targets A and B are present, where the distance Ls between the targets A and B is longer than the predetermined threshold distance Y. When the distance between the targets A and B is relatively long as illustrated in FIG. 10, the distortion correction processor 406 may correct an image for the target A that is closer to the vehicle. For example, when the original graphic 40 has a square shape, the distortion correction processor 406 may correct the distortion of the original graphic 40 in accordance with the inclination and curvature of the windshield 110 and the position of the target A. Then, the HUD device 500 may display the resultant image on the windshield 110.

Figures 11, 12:
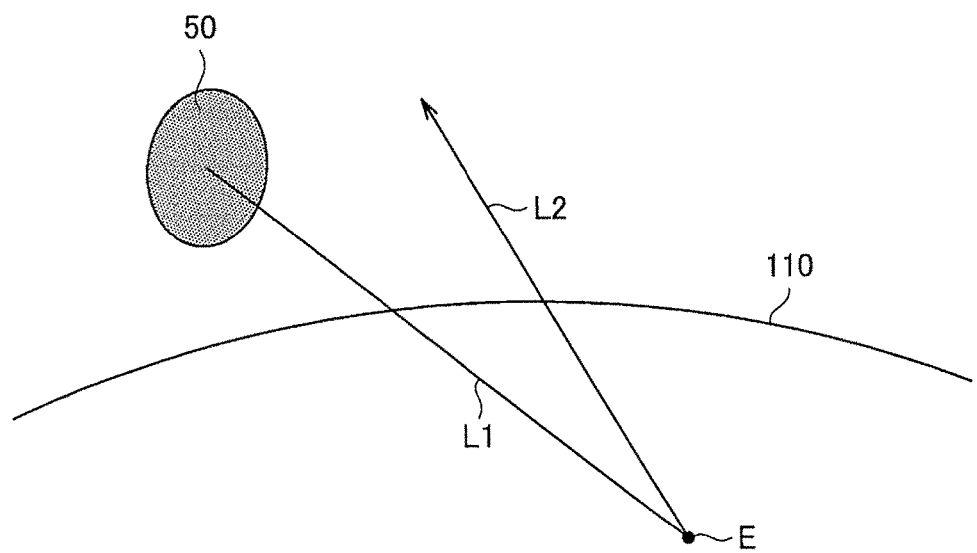
FIG. 11 schematically illustrates an example of a table for use in correcting the distortion of the image when the plurality of targets are present.
FIG. 12 schematically illustrates an example of a method of determining whether the driver is aware of the target outside the vehicle.

FIG. 11 schematically illustrates a table 800 used for the distortion correction by the distortion correction processor 406. As illustrated in FIG. 11, correction amounts in X and Y directions of the windshield may be specified in the table 800 in advance on the basis of a position of a target. In an example implementation, the X direction may be a horizontal direction, and the Y direction may be a vertical direction along the inclination of the windshield 110. The distortion correction processor 406 may alter a shape of the original graphic 40 by using the corresponding correction amount in the table 800, in accordance with a position of the target. In this way, it is possible to provide the image 42, 44, or 46 in which distortion has been corrected. It is to be noted that the correction amounts in the table 800 illustrated in FIG. 11 may be determined in advance from known data regarding the inclination, shape, curvature, and other parameters of the windshield 110 so that distortion is minimized at a corresponding position of a target.

FIG. 12 schematically illustrates an example of a method of determining whether the driver is aware of a target 50 outside the vehicle. Further, FIG. 12 illustrates the windshield 110 as viewed from the top of the vehicle. In other words, FIG. 12 illustrates a cross section of the windshield 110 taken along a horizontal plane at any given height. As illustrated in FIG. 12, when the vehicle-exterior sensors 100 detect the target 50 outside the vehicle, the driver recognition determiner 412 may determine a straight line L1 by which an eye point E of the driver is connected to the target 50. When the driver information acquiring unit 404 acquires the face orientation or direction to the line of sight of the driver, the driver recognition determiner 412 may determine a straight line L2 indicating the face orientation or direction to the line of sight. When the straight line L1 substantially coincides with the straight line L2 or when the straight line L2 is contained in a preset angle range that the straight line L1 traverses at its center, the driver recognition determiner 412 may determine that the driver is aware of the target 50 outside the vehicle. In an example implementation, a default value of the eye point E of the driver may be an average value of an eye location of the driver. In an example implementation where the driver sensor 200 is implemented by a stereo camera, the eye point E of the driver may be acquired by means of principle of triangulation.

Figure 13A:
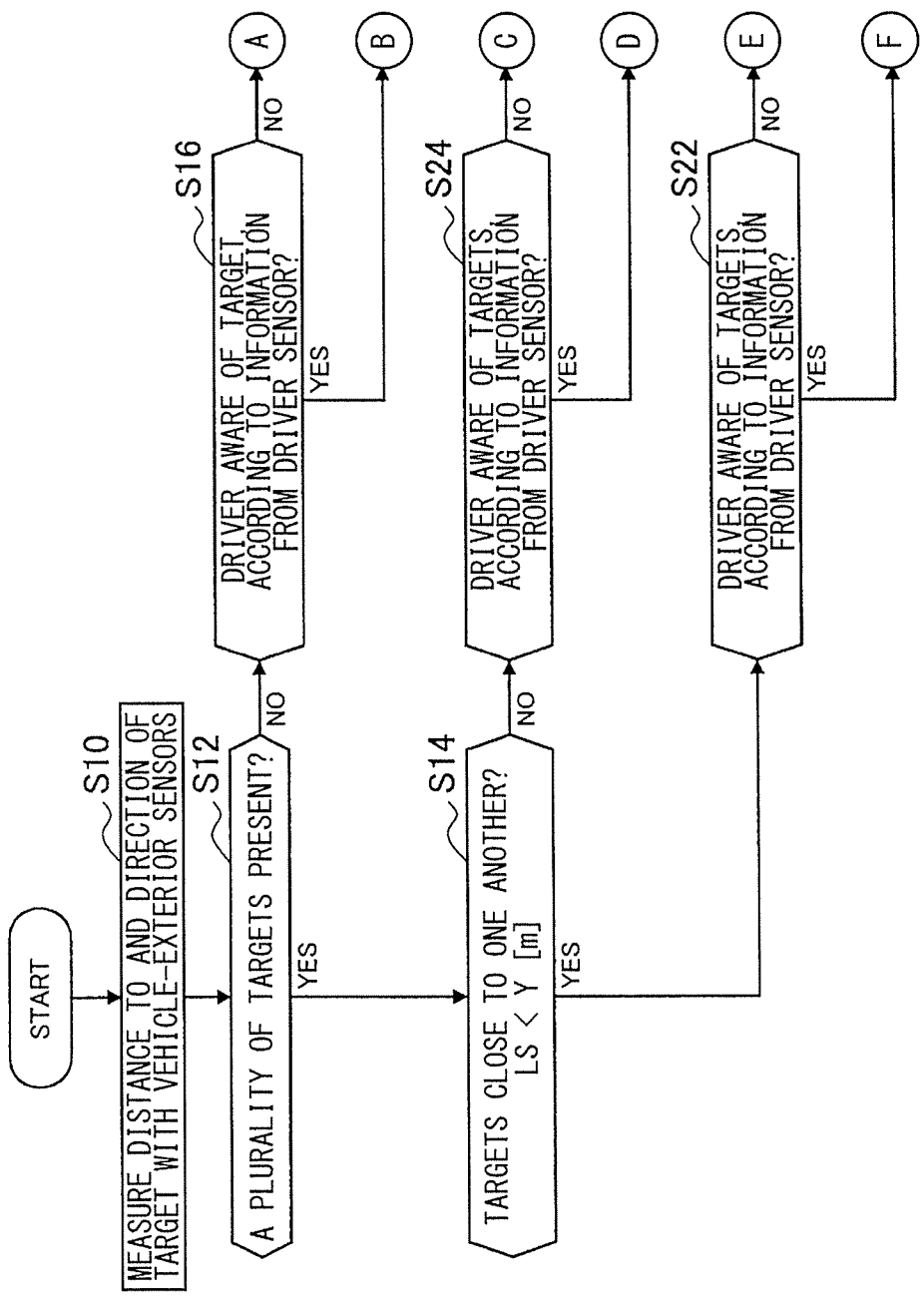
FIGS. 13A and 13B are each a flowchart of an example of a process performed by the vehicle system according to one implementation.
Figure 13B:
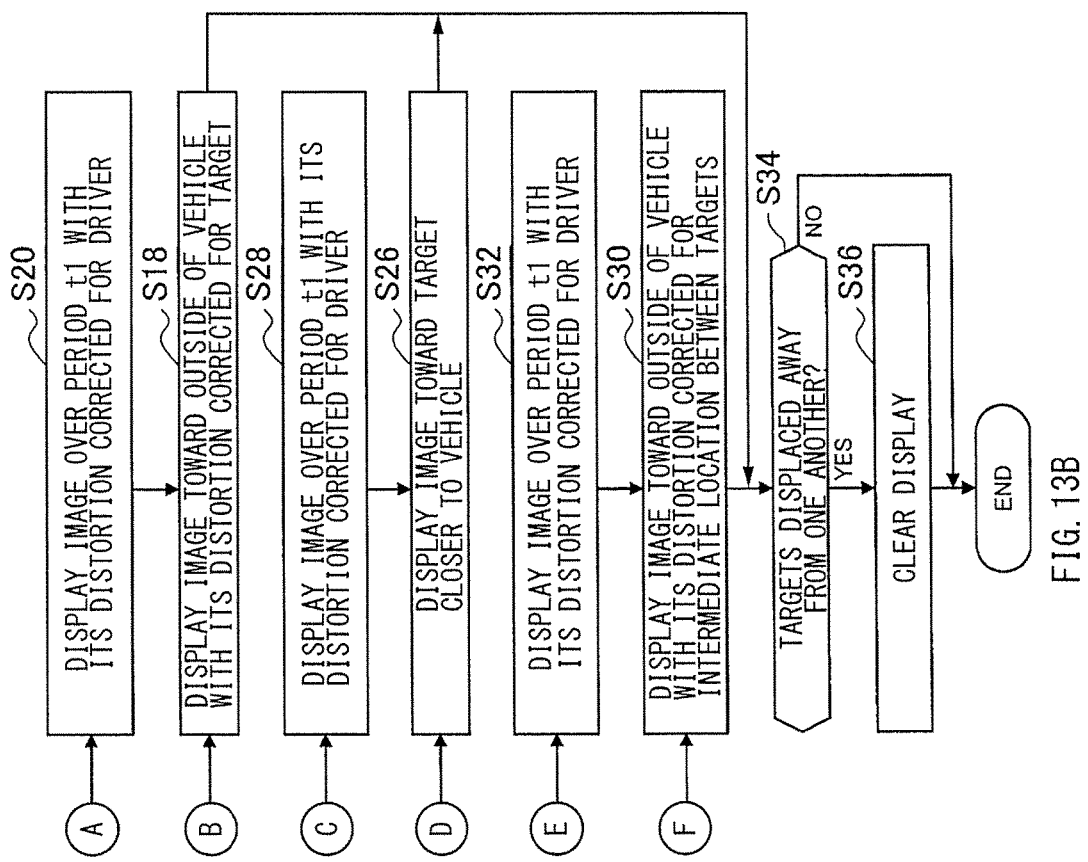

Next, a description is given of an example of a process performed by the vehicle display system 1000 according to one implementation, with reference to a flowchart of FIGS. 13A and 13B. The process of FIGS. 13A and 13B is performed by the components of the controller 400 and is repeated during predetermined control periods. In step S10, the environment information acquiring unit 402 may obtain a distance to and direction of a target, on the basis of information acquired from the vehicle-exterior sensors 100. In an example implementation, the environment information acquiring unit 402 may set one or more targets to other vehicles running side-by-side with the own vehicle and obtain distances to and directions of these targets. In step S12, the environment state determiner 407 may determine whether a plurality of targets are present. When the environment state determiner 407 determines that a plurality of targets are present (S12: YES), the flow may proceed to step S14. When the environment state determiner 407 determines that only one target is present at step S12 (S12: NO), the flow may proceed to step S16.

At step S16, the driver recognition determiner 412 may determine whether the driver is aware of the target, on the basis of the information acquired from the driver sensor 200. When the driver recognition determiner 412 determines that the driver is aware of the target (S16: YES), the flow may proceed to step S18. In step S18, since the driver is aware of the target, the distortion correction processor 406 may correct distortion of an image for the target, and the HUD device 500 may display the resultant image toward the target. In an example implementation, the HUD device 500 may display a warning message saying "DRIVE CAREFULLY" toward another vehicle running side-by-side with the own vehicle. When the driver recognition determiner 412 determines that the driver is not aware of the target at step S16 (S16: NO), the flow may proceed to step S20. In step S20, the distortion correction processor 406 may correct the distortion of the image for the driver, and the HUD device 500 may display the resultant image toward the driver over a predetermined time period t1. In an example implementation, the HUD device 500 may display a warning message saying "BE CAREFUL WITH ANOTHER VEHICLE" toward the driver. After step S20 has been performed, the flow may proceed to step S18.

In step S14 following step S12, since the plurality of targets are present, the distance determiner 410 may determine whether the targets are at short distances from one another. In an example implementation, the distance determiner 410 may compare the distance Ls with the predetermined threshold distance Y, thereby determining whether the relationship Ls<Y is satisfied. When the distance determiner 410 determines that the relationship Ls<Y is satisfied in step S14 (S14: YES), the flow may proceed to step S22. When the distance determiner 410 determines that the relationship Ls≥Y is satisfied in step S14 (S14: NO), the flow may proceed to step S24.

In step S24, the driver recognition determiner 412 may determine whether the driver is aware of the targets. When the driver recognition determiner 412 determines that the driver is aware of the targets (S24: YES), the flow may proceed to step S26. In step S26, since the driver recognition determiner 412 determines that the driver is aware of the targets, the distortion correction processor 406 may correct the distortion of the image for one of the targets which is at the shorter distance from the vehicle. Thereafter, the HUD device 500 may display the resultant image. When the driver recognition determiner 412 determines that the driver is not aware of at least one of the targets at step S24 (S24: NO), the flow may proceed to step S28. In step S28, the distortion correction processor 406 may correct the distortion of the image for the driver, and the HUD device 500 may display the resultant image toward the driver over the predetermined time period t1. After step S28 has been performed, the flow may proceed to step S26.

In step S22, the driver recognition determiner 412 may determine whether the driver is aware of the targets. When the driver recognition determiner 412 determines that the driver is aware of the targets (S22: YES), the flow may proceed to step S30. In step S30, since the driver is aware of the plurality of targets, the distortion correction processor 406 may correct the distortion of the image for an intermediate position between the targets. Thereafter, the HUD device 500 may display the resultant image toward the outside of the vehicle. When the driver recognition determiner 412 determines that the driver is not aware of at least one of the targets (S22: NO), the flow may proceed to step S32. In step S32, the distortion correction processor 406 may correct the distortion of the image for the driver, and the HUD device 500 may display the resultant image toward the driver over the predetermined time period t1. After step S32 has been performed, the flow may proceed to step S30.

After step S18, S26, or S30 has been performed, the flow may proceed to step S34. At step S34, the distance determiner 410 may determine whether the target or targets are displaced away from the own vehicle. In an example implementation, at step S34, the distance determiner 410 may determine whether the target or targets are displaced away from the vehicle so that the target or targets are no longer able to view the image displayed on the window of the vehicle. When the distance determiner 410 determines that the target or targets are displayed away from the vehicle at step S34 (S22: YES), the flow may proceed to step S36. In step S36, the HUD device 500 may clear the display, after which the process in the current control period may be concluded (END). When the distance determiner 410 determines that the target or targets are not displaced away from the vehicle at step S34 (S34: NO), the HUD device 500 may maintain the display, and the process in the current control period may be concluded (END). After the process in the current control period has been concluded, the flow may return to step S10, and a process in a next control period may be performed.

According to one implementation described above, it is possible to reliably identify for which target a message displayed on the HUD device 500 is intended. In one implementation, the distortion of the image is corrected on the basis of the position of the target by which the image to be displayed by the HUD device 500 of the vehicle is to be viewed. Thus, the image is corrected so that the target, for which viewing of the image is intended, is able to view the image easily and clearly, whereas the image may be perceived as being distorted for any target other than the target for which viewing of the image is intended. Hence, it is possible to easily identify for which of persons inside and outside the vehicle the image is intended.

The controller 400 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the controller 400. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the controller 400 illustrated in FIG. 1.

Although some implementations of the technology have been described in the foregoing with reference to the accompanying drawings, the technology is by no means limited to the implementations described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A vehicle display system comprising:
   a position acquiring unit configured to acquire a first position of a first target outside a vehicle;
   a display device configured to display a image to the first target outside the vehicle, the display device mounted on the vehicle; and
   a distortion processor configured to adjust, for the first target, distortion of the image based on the acquired first position of the first target,
   wherein the display device displays, to the first target outside the vehicle, the image with the distortion adjusted for the first target.

2. The vehicle display system according to claim 1, wherein
   the position acquiring unit is further configured to acquire a second position of a second target outside the vehicle,
   the display device is further configured to display the image to the first target and the second target outside the vehicle,
   when the position acquiring unit acquires the second position of the second target outside the vehicle while the first target is present, the distortion processor adjusts, for the first target and the second target, the distortion of the image based on the first position of the first target and the second position of the second target, and
   the display device displays, to the first target and the second target outside the vehicle, the image with the distortion adjusted for the first target and the second target.

3. The vehicle display system according to claim 2, wherein when a distance between the first position of the first target and the second position of the second target is less than a predetermined distance, the distortion processor:
   determines an intermediate position between the first position of the first target and the second position of the second target; and
   adjusts, for the first target and the second target outside the vehicle, the distortion of the image based on the determined intermediate position.

4. The vehicle display system according to claim 2, wherein when a distance between the first position of the first target and the second position of the second target is equal to or greater than a predetermined distance, the distortion processor adjusts, for the first target and the second target, the distortion of the image based on one of the first position of the first target and the second position of the second target that is closer to the vehicle than another of the first position of the first target and the second position of the second target.

5. The vehicle display system according to claim 1, further comprising a driver recognition determiner configured to determine whether a driver of the vehicle recognizes the first target outside the vehicle,
wherein when the driver recognition determiner determines that the driver of the vehicle recognizes the first target outside the vehicle, the distortion processor adjusts, for the first target, the distortion of the image based on the first position of the first target.

6. The vehicle display system according to claim 2, further comprising a driver recognition determiner configured to determine whether a driver of the vehicle recognizes the first target and the second target outside the vehicle,
wherein when the driver recognition determiner determines that the driver of the vehicle recognizes the first target and the second target outside the vehicle, the distortion processor adjusts, for the first target and the second target outside the vehicle, the distortion of the image based on the first position of the first target and the second position of the second target.

7. The vehicle display system according to claim 5, wherein
the display device is further configured to display the image to the driver, and
when the driver recognition determiner determines that the driver does not recognize the first target outside the vehicle, the distortion processor adjusts, for the driver, the distortion of the image based on a position of the driver.

8. The vehicle display system according to claim 6, wherein
the display device is further configured to display the image to the driver, and
when the driver recognition determiner determines that the driver does not recognize the first target and the second target outside the vehicle, the distortion processor adjusts, for the driver, the distortion of the image based on a position of the driver.

9. The vehicle display system according to claim 7, wherein
the display device displays, to the driver, the image with the distortion adjusted for the driver for a predetermined time period, and
after the display device displays, to the driver, the image with the distortion adjusted for the driver for the predetermined time period, the display device displays, to the first target outside the vehicle, the image with the distortion adjusted for the first target.

10. The vehicle display system according to claim 8, wherein
the display device displays, to the driver, the image with the distortion adjusted for the driver for a predetermined time period, and
after the display device displays, to the driver, the image with the distortion adjusted for the driver for the predetermined time period, the display device displays, to the first target and the second target outside the vehicle, the image with the distortion adjusted for the first target and the second target.

11. The vehicle display system according to claim 1, further comprising a display controller configured to control displaying performed by the display device to display the image in which the distortion has been corrected by the distortion correction processor.

12. The vehicle display system according to claim 2, further comprising a display controller configured to control displaying performed by the display device to display the image in which the distortion has been corrected by the distortion correction processor.

13. The vehicle display system according to claim 3, further comprising a display controller configured to control displaying performed by the display device to display the image in which the distortion has been corrected by the distortion correction processor.

14. The vehicle display system according to claim 4, further comprising a display controller configured to control displaying performed by the display device to display the image in which the distortion has been corrected by the distortion correction processor.

15. A method of controlling a vehicle display system, the method comprising:
acquiring a position of a target outside a vehicle;
determining that a driver of the vehicle is unaware of the target outside the vehicle;
generating a first image for the driver;
adjusting, for the driver, distortion of the first image based on a position of the driver;
displaying, to the driver for a period of time, the first image with the distortion adjusted for the driver;
generating a second image the target outside the vehicle;
adjusting, for the target outside the vehicle, distortion of the second image based on the position of the target outside the vehicle; and
displaying, to the target outside the vehicle after the first image is displayed for the period of time, the second image with the distortion adjusted for the target.

16. A vehicle display system comprising:
a display device mounted on a vehicle; and
circuitry configured to:
generate an image to be displayed on the display device;
acquire a position of a target outside the vehicle;
determine that the image is to be displayed to the target outside the vehicle based on determining that a driver of the vehicle recognizes the target outside the vehicle;
adjust, in response to determining that the image is to be displayed to the target outside the vehicle, distortion of the image based on the acquired first position of the target; and
display, on the display device towards the target, the image with the distortion adjusted based on the first position of the first target.

* * * * *